United States Patent

[11] 3,617,073

[72] Inventors Irving Landsman;
Emanuel Landsman, both of 365 Central Park Ave., New York, N.Y. 10704
[21] Appl. No. 858,592
[22] Filed Sept. 17, 1969
[45] Patented Nov. 2, 1971

[54] AUTOMOBILE SAFETY SYSTEM
10 Claims, 8 Drawing Figs.

[52] U.S. Cl. ................................................ 280/150 AB,
200/61.89, 200/86.5
[51] Int. Cl. ..................................................... B60r 21/08
[50] Field of Search ........................................... 280/150
AB; 180/82; 200/61.89, 86.5; 296/84 K

[56] References Cited
UNITED STATES PATENTS

| | | | |
|---|---|---|---|
| 2,755,125 | 7/1956 | Hodges | 280/150 AB |
| 2,806,737 | 9/1957 | Maxwell | 296/84 K |
| 2,834,606 | 5/1958 | Bertrand | 280/150 AB |
| 2,902,292 | 9/1959 | Land | 280/150 AB |
| 3,172,684 | 3/1965 | Isaac | 280/150 AB |
| 3,510,150 | 5/1970 | Wilfert | 280/150 AB |
| 3,473,824 | 10/1969 | Carey et al. | 280/150 AB |
| 3,514,125 | 5/1970 | Nemecek | 280/150 AB |

FOREIGN PATENTS

| | | | |
|---|---|---|---|
| 1,079,612 | 8/1967 | Great Britain | 280/150 AB |
| 231,094 | 11/1960 | Australia | 180/82 |
| 953,312 | 3/1964 | Great Britain | 280/150 AB |
| 1,392,677 | 2/1965 | France | 280/150 AB |

Primary Examiner—Benjamin Hersh
Assistant Examiner—John A. Pekar
Attorney—Arthur B. Colvin ABSTRACT: The present disclosure relates to an automobile safety system which provides that inflated members shall be ejected across the body of the driver and passengers without obstructing their vision and also across the lower windshield to prevent physical injury. The inflated members are supplied by a tank of compressed air or other fluid positioned in the interior of the automotive vehicle under the hood or in the rear baggage compartment and the inflation and release of the inflated members takes place as the result of extra pressure on the foot or pedal brake. The inflatable members, when not in use, are desirably collapsed into receivers on the side posts along the windshield and also in receptacles along the interior of the doors. The rear compartment may be provided with an inflatable member positioned in the back of the front seat.

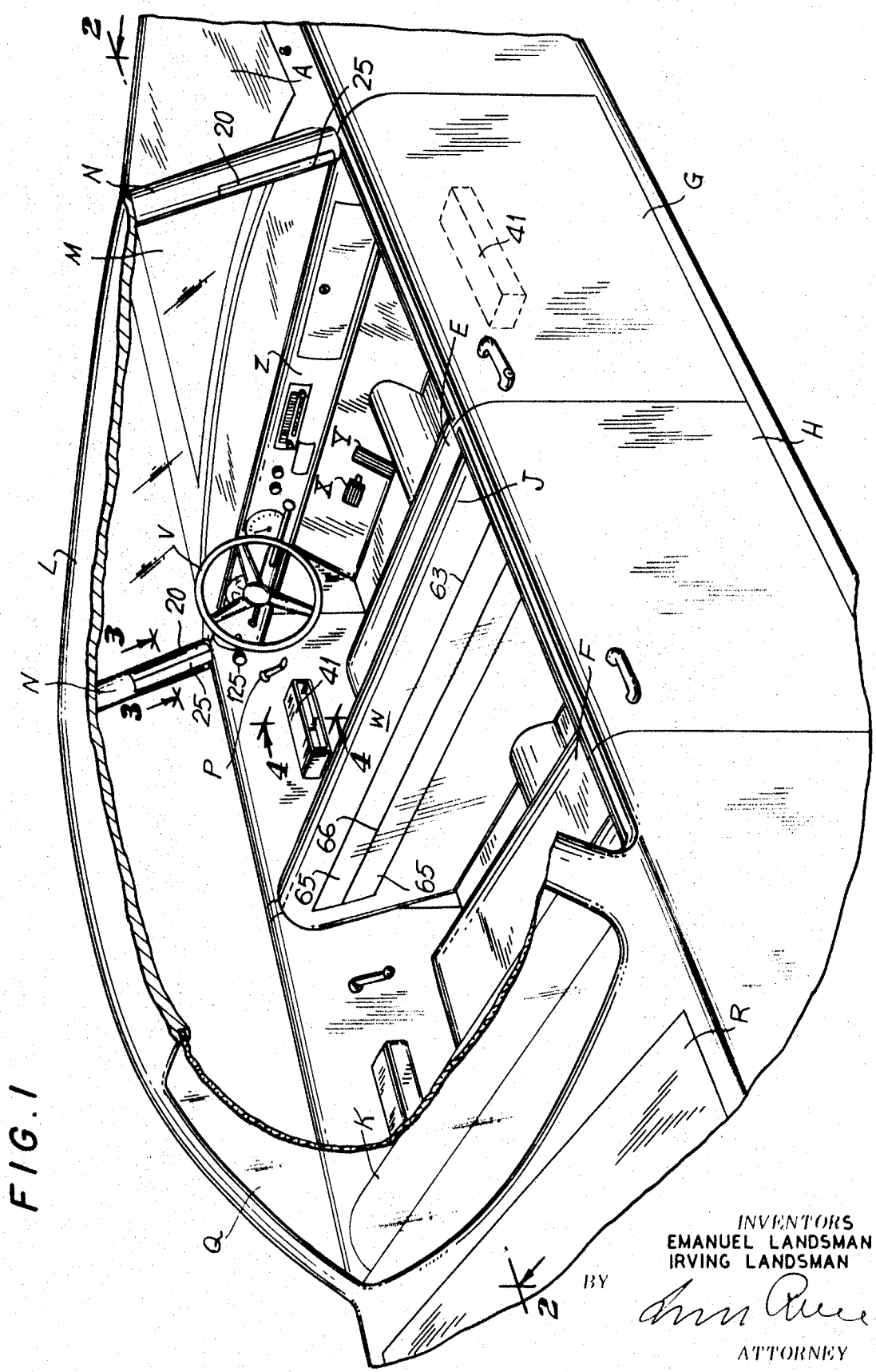

INVENTORS
EMANUEL LANDSMAN
IRVING LANDSMAN
BY
ATTORNEY

PATENTED NOV 2 1971 3,617,073

INVENTORS
EMANUEL LANDSMAN
IRVING LANDSMAN

BY

ATTORNEY

INVENTORS
EMANUEL LANDSMAN
IRVING LANDSMAN

BY

ATTORNEY

AUTOMOBILE SAFETY SYSTEM

DESCRIPTION OF THE INVENTION

The present invention relates to a safety system for the driver and passengers of an automotive vehicle which will be effective in case of collision or threatened collision and which will protect both the drivers and passengers against bodily injury.

It is among the objects of the present invention to provide a simple reliable system to protect both the driver and passengers of a vehicle against bodily injury and particularly against collision with interior parts of the automotive vehicle against either fixed or movable bodies.

Another object is to provide a safety system which will be released immediately prior to a collision by automatic action of the driver or operator of the vehicle, which will have the effect of preventing violent contact of any passenger or driver against the windshield or other fixed objects within the automobile interior.

A still further object is a safety system which will supplement or replace automotive vehicle belts, whether of the shoulder or waist type, which safety system does not depend upon any voluntary action of the passengers, who would normally be unprotected unless they fastened the various types of safety belts provided with automotive vehicles.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to provide expandable balloon or bellows devices which normally are held with enclosures in the interior of the automotive vehicle and which are subject to being propelled or projected within the body of the vehicle so as to protect the driver as well as the passengers in both the front and rear seats.

The seats may be provided with containers or receptacles at the sides thereof which would normally project an inflatable bellows device across the knees and lap of the driver and passengers to prevent the lower part of the body being thrown forward against the steering wheel or dashboard in the case of the front riders or against the front seat in the case of the rear riders.

These collapsible bellows may be positioned in compartments on the inside of the doors on each side of the automotive vehicle, or in the case of the rear of the automotive vehicle they may be placed in the rear of the front seat. To protect the head and upper part of the body of the driver and front passengers, desirably bellows are expanded across the lower part of the windshield but at a height so as not to obscure or prevent forward vision of the driver to cause him to lose control of the vehicle.

These projecting gas-inflatable devices are desirably supplied through a valve from a tank of compressed air or other gaseous fluid under the front hood or rear luggage compartment of the vehicle, and this tank is kept full of compressed gas at a desired pressure of two or three times that of atmospheric pressure at all times by operation of a fluid or air compressor operated by the automotive vehicle or by a cylinder of compressed carbon dioxide, for example.

According to the invention, the method of operating or actuating these inflatable devices is by the brake pedal, which, upon extra pressure, will release the compressed gas into the inflatable devices by opening a valve leading to the conduits from the compressed gas source to the inflatable devices.

More particularly, the foot brake pedal desirably has an adjustable spring pressed displaceable plate, which, upon the extra force which would be applied to avoid a collision, would close a switch to open the valve from the compressed gas source to the conduits leading to the inflatable devices.

The foot pedal itself may be provided with a valving member which will actuate the connection between the conduits and the compressed gas source, or it may be provided with a hydraulic pressure means to apply hydraulic pressure or pneumatic pressure to close the switch, which will operate a valve between the source of compressed gas and the inflatable expandable devices.

The inflatable expandable devices are desirably of the bellows type so that they can be readily inflated from a convenient container at the side of the vehicle and readily withdrawn into these containers by means of springs or other withdrawing means. The withdrawing means may consist of an interiorly located coil spring or an exterior telescoping spring actuated sleeve or cylinder member.

The containers at the interior sides of the doors and in the lower part of the windshield, and side posts and/or in the back of the front seat may have automatically opening and closing spring pressed doors which will open upon expansion of the bellows devices or members and which will close when the bellows members are withdrawn back into their containers after the emergency has passed.

BRIEF DESCRIPTION OF DRAWINGS

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a fragmentary view of the interior of an automotive vehicle with the roof, back and side broken away to more clearly show the interior construction.

Referring to FIGS. 1 and 2, FIG. 1 shows the interior of the automotive vehicle without passengers and with the expandable extensible bellows in their containers, while FIG. 2 shows the vehicle with the riders, including the driver and the passengers, and the bellows expanded.

Referring to FIGS. 1 and 2, the automotive vehicle has the hood A in which may be enclosed the fluid pressure or air pressure cylinder or container B. The front bumper C in FIG. 2 is indicated as being closely adjacent to or about to strike an obstruction D which may consist of the back of another vehicle or truck. The front seat E and the rear seat F are positioned between the side doors G at the front and H at the rear, and each seat has a back support portion J and K.

The top enclosure L is supported forwardly by the windshield M, which has the side posts N. The rear window Q closes the back of the body and there may be side windows fitting in the door panels H and G and elevated by means of the turn handle P.

Figure 2:
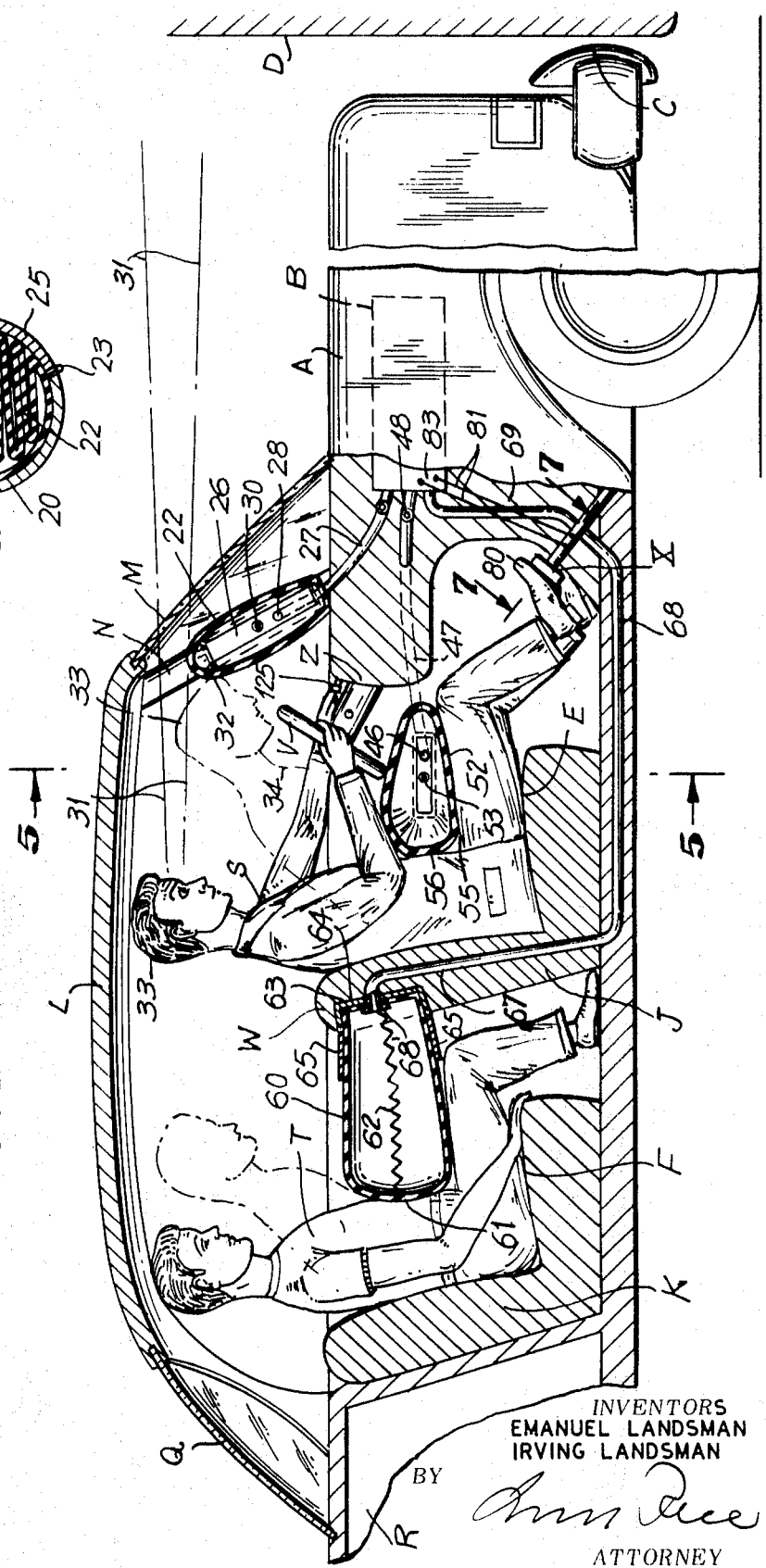
FIG. 2 is a transverse vertical sectional view upon the line 2—2 of FIG. 1.
Figure 4:
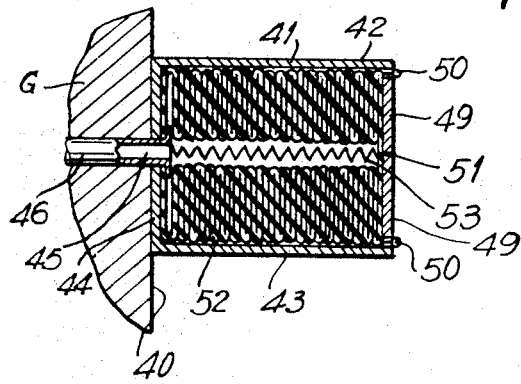
FIG. 4 is a fragmentary transverse vertical sectional view, upon an enlarged scale as compared to FIG. 1, upon the line 4—4 of FIG. 1, showing the collapsed expandable member in said interior side door container.

The rear compartment R can also or alternately receive in a compressed air or compressed fluid container, such as B. The automotive vehicle itself is shown as having a driver S and a passenger T on the left side, as shown in FIG. 2, with other passengers being on the right side. The windshield M and the steering wheel V are obstructions which might injure the driver and the front passenger, whereas the top of the front seat is indicated at W as a possible source of injury to the rear passenger T. The interior of the car is provided with a brake pedal X and can accelerator pedal Y below the dashboard Z.

Figure 3:
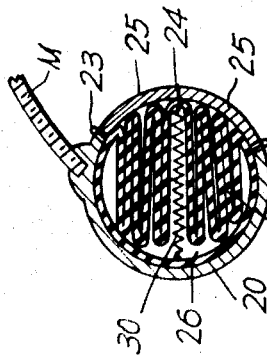
FIG. 3 is a transverse horizontal sectional view upon an enlarged scale as compared to FIG. 1 of one of the side posts receiving the collapsed pneumatic expandable device.

According to the present invention, the lower part of the side posts N at 20 act as containers for an expandable bellows 22, which container has doors 25 which as shown in FIG. 3 will open on their hinges 23 at the split 24 as a result of expansion of the bellows 22 against the doors 25 of the container 20 which causes the doors 25 to swing away from each other as the compressed air enters the interior 26 of the bellows 22 through the conduit 27 (see FIG. 2) from the compressed air container B.

The compressed air conduit 27 has an opening or inlet 28 into the interior 26 of the bellows 22 (see FIG. 2). The introduction of compressed air into the bellows through the inlet 28 will open the doors 25 and rapidly expand the bellows 22 across the lower part of the windshield until they almost touch, as indicated at 29 in FIG. 5.

These collapsible bellows are normally retarded by the spring 30, which is shown as interiorly within the expandable envelope but which may be carried by means of a telescoping connection on the outside of the expandable bellows 22. The expansion of these bellows will take a fraction of a second after the air has been released into the opening or inlet 28. It will be noted that these windshield bellows 22 cover only the lower part of the windshield, leaving the upper portion open for the vision of the driver S, as indicated at 31.

At the same time that the head 33 of the driver is flung forwardly as indicated at 32 in FIG. 2, his head will strike the expanded bellows or envelop 22 and will not strike the windshield M. At the same time the driver will have sufficient vision, as indicated at 31, to look through the upper part of the windshield and control the vehicle as soon as he recovers.

The angle at which he strikes the expandable device 22, as indicated at 32, is sufficient to keep his body at 34 from striking the steering wheel V, as shown best in FIG. 2.

At the same time the inside 40 of the side doors G will have containers 41, which are of elongated rectangular shape and have the top wall 42, the bottom wall 43 and the back wall 44 which is mounted on the inside base 40 of the side door G. The side door G has an inlet at 45 from the end 46 of the conduit 47, which also connects at 48 to the air pressure cylinder B. The front of the compartments 41 has the closure doors 49, with the spring closure hinges 50 and the split 51. The expandable bellows 52, with the return spring 53, is designed to shoot out to the position indicated in FIGS. 2 and 5, with a short spacing 54 between the two bellows when they are in fully expanded position.

Figure 5:
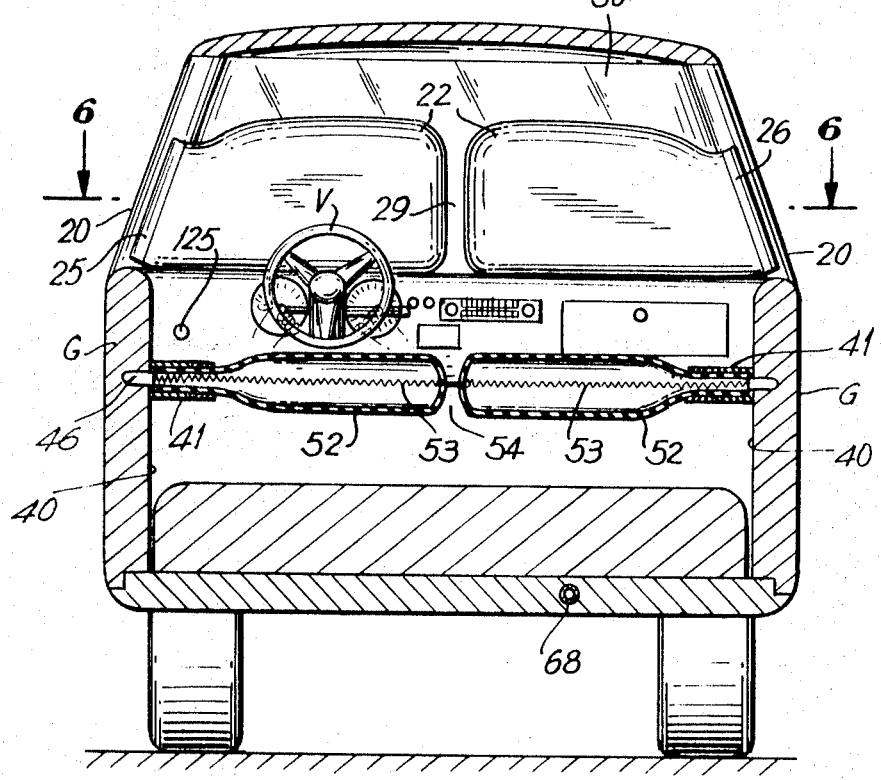
FIG. 5 is a transverse vertical sectional view taken upon the line 5—5 of FIG. 2, showing the position of the expanded members, both across the lower part of the windshield and across the knees or lap of the driver and front passengers.
Figure 6:
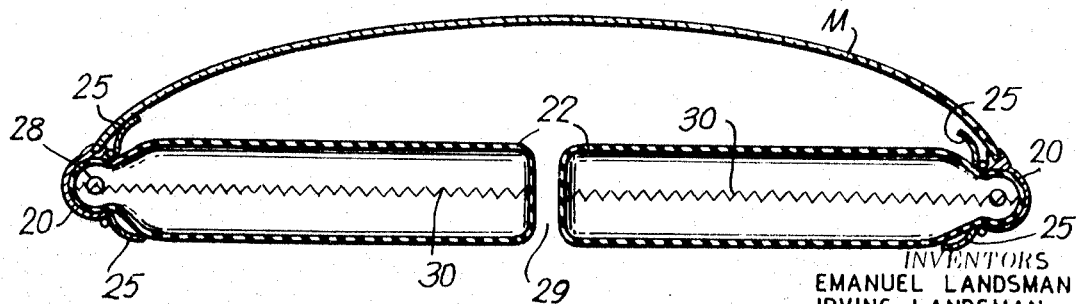
FIG. 6 is a transverse horizontal sectional view upon the line 6—6 of FIG. 5, showing the location of the expanded members across the lower part of the windshield of an automotive vehicle.

In FIG. 5 is shown the position of the expanded bellows 52. The bellows will extend over the lap 55 of the driver and front passenger and will prevent the lower portion of the body 56 (see FIG. 2) from being moved forwardly against the dashboard Z or against the steering wheel V.

The rear protecting envelope 60, which expands against the lower part 61 of the body T of the rear passenger, has a return spring 62 and when collapsed fits in the container 63 in the rear 64 of the seat W. The container 63 has the spring-closed doors 65, with the opening at 66 to receive the collapsed expandable member 60, which will be withdrawn thereinto with the doors automatically closing when the pressure is released.

The conduit 67 extends through the back J of the front seat and has an outlet 68' into the bottom of the container 63 and extends under the front passenger compartment at 68 and then in front of the front passenger compartment 69 to communicate with the compressed air chamber B.

An important factor of the present invention resides in the manner of initiating the operation of the safety system, including the release and expansion of the inflatable members 22, 52, and 60. This is accomplished preferably by the brake pedal, which, when subjected to a sufficient extra high pressure from the foot 80 of the driver, will actuate an electric circuit 81 (see FIG. 2) to operate a valving arrangement at 83 in the tank or container of compressed air B.

Figure 7:
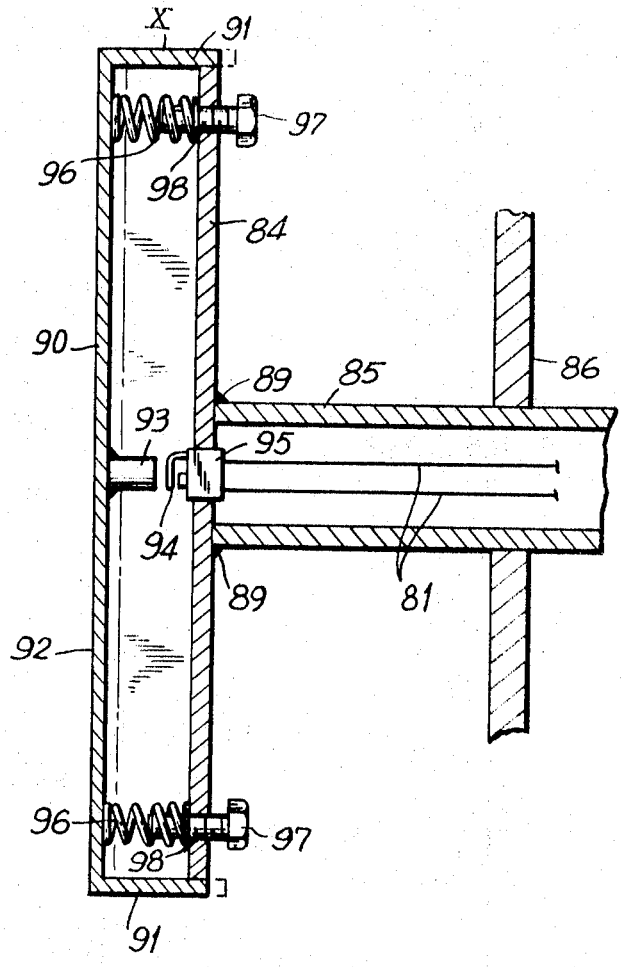
FIG. 7 is a transverse vertical sectional view taken upon the line 7—7 of FIG. 2 and upon an enlarged scale as compared to FIG. 2, showing the brake pedal construction.

The actuator is shown best in FIG. 7 and it consists of a double pedal plate consisting of a baseplate 84 mounted on the hollow extension 85 which extends through the floorboard 86 and which actuates the brakes in conventional manner. This plate is joined as indicated at 89 to the baseplate 84. The baseplate 84 is enclosed by the cup-shaped foot contact pedal 90 having the sidewalls 91 enclosing the base plate 84 and a foot contact face 92 which will be subject to extra pressure immediately prior to an accident.

The interior of the foot contact element 92 has an extending stud 93 which actuates the switch 94 having the casing 95, and closes the circuit across the conduits 81, which in turn opens the air valve 83 to feed air under pressure through the conduits 27 to the bellows 22; through the conduit 47 to the bellows 52 and through the conduits 67 and 68 to the bellows 60.

The amount of extra pressure required to actuate switch 94 can be adjusted by adjusting the force exerted by coil spring 96, one end of which reacts against plate 92 and the other end of which reacts against a washer or plate rigid with an associated adjustment screw 97. The screws 97 also act as a stop for the plate 92. Thus, in normal use of the brake pedal, the springs 96 will keep stud 92 spaced from switch 94.

When a sudden stop is required to prevent a collision and when an emergency jamming of the brakes takes place, which results in the application of relatively great force against plate 92, the force of spring 96 will be overcome and the plate 92 will be forced downwardly resulting in closure of the switch 94 by stud 93 and establishment of the circuit 81 to open the valve at 83 in the pressure tank B.

Figure 8:
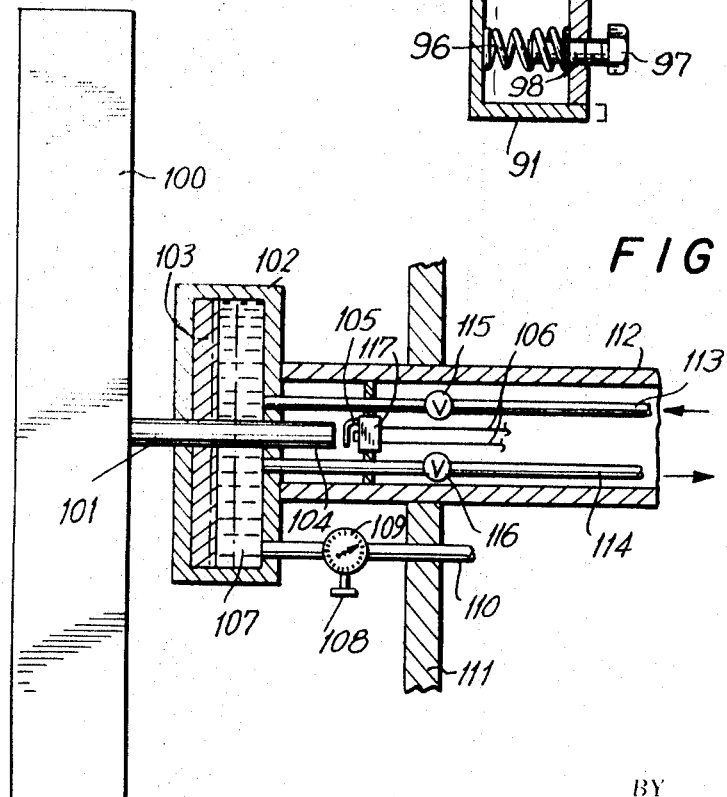
FIG. 8 is a transverse vertical sectional view similar to FIG. 7, showing the section of the brake pedal using an alternative means for actuating the expanding bellows.

In the alternative arrangement shown in FIG. 8 the foot brake pedal 100 has a piston rod 101 extending into and through the hydraulic cylinder 102. This piston rod 101 carries a piston 103 rigid therewith, which when forced downward suddenly, will cause the lower end 104 of the rod 101 to close the switch 105 and establish the circuit 106 to open a valve in the air pressure cylinder B.

Within the hollow shaft 112, to which cylinder 102 is rigidly connected and which actuates the brakes in conventional manner, is positioned the inlet fluid or liquid conduit 113 and the outlet fluid conduit 114 having respectively the valves 115 and 116. The contact switch 105 is mounted on the casing 117.

With the pressure regulating valve 108, which is connected to cylinder 102 through discharge conduit 110, in closed position and with inlet valve 115 open fully and outlet valve 116 opened slightly, liquid under pressure is forced into the cylinder 102 to charge the latter thereby moving the piston to its retracted position. Thereupon, the valves 115 and 116 are closed and the pressure regulating valve 108 is set to a predetermined pressure as indicated on gauge 109.

Thus, with valves 115, 116 and 108 closed, the liquid in cylinder 102 will act as substantially a solid member to prevent movement of piston 103 and hence piston rod 101. Thus, when the brake pedal 100 is pressed in normal use, the hollow shaft 112 will move through wall 111 to actuate the brakes in conventional manner.

In the arrangement shown in FIG. 8, normal braking pressure against brake pedal 100 will not be sufficient to cause flow from cylinder 102 through pressure regulating valve 108. Thus, the piston 103 and rod 101 will not move relative to shaft 112 and switch 105 will not be actuated.

However, upon the application of a large force against the pedal 100 due to emergency jamming on of the brake to avoid collision, the consequent pressure in cylinder 102 will cause valve 108 to open so that piston 103 and piston rod 101 may move relative to shaft 112 to enable end 104 of rod 101 to close switch 105 to permit flow of gas under pressure to the bellows.

Where extra manual operation may also be desired, a release button 125 can be positioned upon the dashboard as shown in FIGS. 1, 2 and 5, so as to permit release of the fluid by manual operation, which may be in addition to the brake pedal operation at X.

It is thus apparent that the applicants have provided a reliable safety system for a passenger automotive vehicle, which could also be applied to other types of vehicles, particularly trucks. It is less applicable to trains, buses and airplanes, but also has an application in this respect.

THe safety system is usually desirably set off by the additional pressure exerted on a brake pedal by the driver when a collision may seem to be imminent and in this case the driver subconsciously or almost automatically applies an extra pressure to the brake pedal not applied in ordinary driving. It is this extra pressure which initiates the safety system by releasing the air pressure into the expandable containers which are ejected across the body and chest of the driver and passengers and over the lower windshield.

Similar devices can be utilized for ejection over the dashboard where desirable, or even across the steering wheel to prevent the steering wheel coming into direct violent contact with the body of the driver. The expandable containers are desirably arranged so that they will readily extend downwardly when under pressure and be withdrawn into their containers past the open doors, which will then be spring closed after the emergency has passed.

The withdrawal of the expanded members can be accomplished by spring means as shown or by the conformation of the expanded container, which will automatically fold up and pass back into the container when the pressure is released. The doors of the containers are so arranged that they will permit sliding outwardly of the expandable body when ejected and withdrawal of the expanded body when it is being deflated after the emergency is past.

This deflation may take place through the release button on the dashboard, such as shown, or by other means which will cut off the air cylinder and release the expanded containers so that they can discharge into atmospheric pressure through the inlet opening.

As many changes could be made in the above automobile safety system, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A safety system for automobiles and like vehicles having a brake pedal mounted on the brake shaft comprising a source of gas under pressure, expandable means mounted in said vehicle adapted to expand to extend between the body of the driver and the rigid members of said vehicle in front of said driver, container means for said expandable means located in the body of the vehicle, adapted automatically to open upon expansion of said expandable means, and means to connect said source of gas under pressure to said expandable means, said means comprising control elements associated with said brake pedal and said brake shaft actuated by sudden relatively great pressure exerted against said brake pedal to avoid collision.

2. The system of claim 1 in which said expandable means comprises a bellows.

3. The system of claim 1 in which means are provided associated with said expandable means to retract the latter into the associated container means.

4. The combination set forth in claim 3 in which said retracting means comprises a spring positioned in said bellows.

5. The system of claim 1 in which a plurality of expandable means are provided each having an associated container means, said plurality of expandable means being adapted to extend when inflated between the body of the driver, the bodies of the passengers and the rigid members in front of said driver and said passengers.

6. The system set forth in claim 1 in which said container means comprises a container in which said expandable means is positioned, said container having a hinged door normally resiliently urged to closed position and automatically opened when said expandable means is inflated.

7. The system of claim 1 in which said control elements associated with said brake pedal comprise a switch rigidly mounted with respect to said brake shaft and a movable actuating member carried by said brake pedal, means normally spacing said actuating member from said switch and restraining relative movement between said actuating member and said brake shaft whereby when the force exerted against said brake pedal exceeds a predetermined amount said actuating member will move relative to said brake shaft to actuate said switch.

8. The system of claim 7 in which said control elements comprise a plate rigid with said brake shaft, said switch being rigidly mounted on said plate, a second plate mounted in substantially parallel relation to said first plate and movable toward and away from the latter, said second plate carrying said actuating member aligned with said switch, resilient means between said two plates normally spacing the latter to retain the actuating member spaced from said switch whereby upon application of a predetermined force to said second plate said actuating member will move against the force exerted by said spring to actuate said switch.

9. The system set forth in claim 8 in which means are provided to adjust the force exerted by said resilient means.

10. The system of claim 7 in which said control elements comprise a hydraulic cylinder rigid with said shaft, said cylinder having a piston slidably mounted therein, a piston rod extending through said cylinder and said piston and rigidly connected to said piston, said piston rod comprising said actuating member, a plate secured to the outer end of said piston rod and defining said brake pedal, means to charge said cylinder with liquid under pressure to retain said piston in retracted position and to retain said actuating rod spaced from said switch, valve means to cut off flow of fluid through said charging means, a pressure regulator valve connected to said cylinder, means to set said pressure regulator valve to open at a predetermined pressure whereby when the force exerted against said brake pedal plate exceeds a predetermined amount said pressure regulator valve will open to permit relative movement between said piston rod and said switch for actuation of said switch.